US008820575B2

(12) United States Patent
Nicholson

(10) Patent No.: US 8,820,575 B2
(45) Date of Patent: Sep. 2, 2014

(54) DIGITAL SIGNAGE RETROFIT FOR VENDING MACHINE

(75) Inventor: Robert Nicholson, Alpharetta, GA (US)

(73) Assignee: Convergent Media Systems Corporation, Alpharetta, GA (US)

( * ) Notice: Subject to any disclaimer, the term of this patent is extended or adjusted under 35 U.S.C. 154(b) by 280 days.

(21) Appl. No.: 13/404,283

(22) Filed: Feb. 24, 2012

(65) Prior Publication Data

US 2012/0316672 A1 Dec. 13, 2012

Related U.S. Application Data

(60) Provisional application No. 61/496,267, filed on Jun. 13, 2011, provisional application No. 61/590,931, filed on Jan. 26, 2012.

(51) Int. Cl.
*G06F 17/00* (2006.01)
*G07F 11/00* (2006.01)
*G07F 9/02* (2006.01)

(52) U.S. Cl.
CPC ................ *G07F 9/023* (2013.01); *G07F 9/026* (2013.01); *G07F 11/002* (2013.01)
USPC ................................ 221/155; 221/8; 700/231

(58) Field of Classification Search
CPC ..... G07F 9/023; G07F 17/0014; G07F 3/044; G07F 9/026; G07F 9/02
USPC ...................................................... 221/155, 8
See application file for complete search history.

(56) References Cited

U.S. PATENT DOCUMENTS 5,831,862 A * 11/1998 Hetrick et al. .................... 221/8
6,864,882 B2 * 3/2005 Newton ........................ 345/173
7,783,381 B2 * 8/2010 Walker et al. ................. 700/240
7,805,338 B2 9/2010 Kolls (Continued)

FOREIGN PATENT DOCUMENTS

CN 101263444 A 9/2008
CN 102005090 A 4/2011

(Continued)

OTHER PUBLICATIONS

Product Brief, SpinetiX HMP100, The World's First Hyper Media Player, Spinetix, Date unknown, Printed Jan. 19, 2012.
Intel White Paper, Generating More Vending Machine Revenue, Intel Corporation, Date unknown, Creation date Mar. 11, 2011.
Chinese Office Action for Chinese Application No. 201210181253.4 dated Jan. 16, 2014.

*Primary Examiner* — Timothy Waggoner
(74) *Attorney, Agent, or Firm* — Sutherland Asbill & Brennan LLP

(57) ABSTRACT

Embodiments of the disclosure include a vending machine retrofitted with digital signage. According to an embodiment, a display panel is affixed to the window; a media player is coupled to the display panel; a cellular wide area network (WAN) radio is coupled to the media player; and a cellular antenna is coupled to the cellular WAN radio and affixed to the top surface of the vending machine.

18 Claims, 10 Drawing Sheets

(56) References Cited

U.S. PATENT DOCUMENTS

| | | | | |
|---|---|---|---|---|
| 7,987,184 | B2 * | 7/2011 | Ishitani et al. | 707/727 |
| 8,170,713 | B2 * | 5/2012 | Levasseur et al. | 221/155 |
| 8,417,376 | B1 * | 4/2013 | Smolen | 221/155 |
| 2004/0133466 | A1 | 7/2004 | Redmond et al. | |
| 2005/0107912 | A1 | 5/2005 | Martin et al. | |
| 2010/0193537 | A1 | 8/2010 | Doglioni Majer | |
| 2010/0235240 | A1 | 9/2010 | Park et al. | |
| 2010/0237091 | A1 | 9/2010 | Garson et al. | |
| 2010/0262280 | A1 | 10/2010 | Miller et al. | |
| 2010/0268792 | A1 | 10/2010 | Butler et al. | |

FOREIGN PATENT DOCUMENTS

| | | | |
|---|---|---|---|
| CN | 102059389 | A | 5/2011 |
| JP | H07-272074 | A | 10/1995 |
| WO | 2010-107172 | A1 | 9/2010 |

* cited by examiner

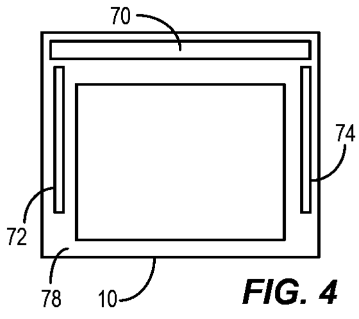
FIG. 4
FIG. 5
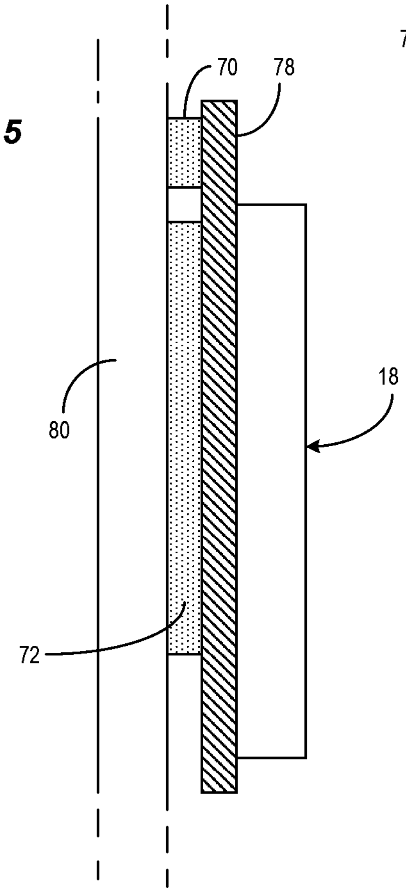

100

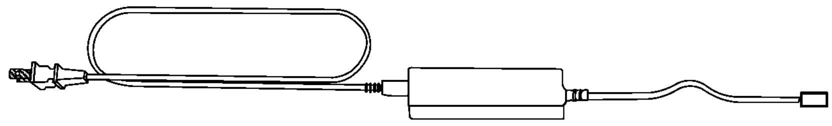
FIG. 10
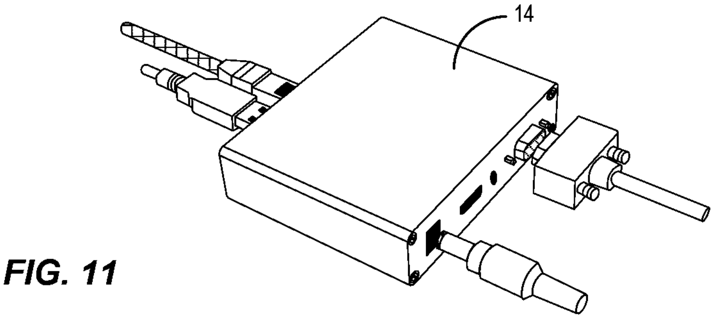
FIG. 11
FIG. 12
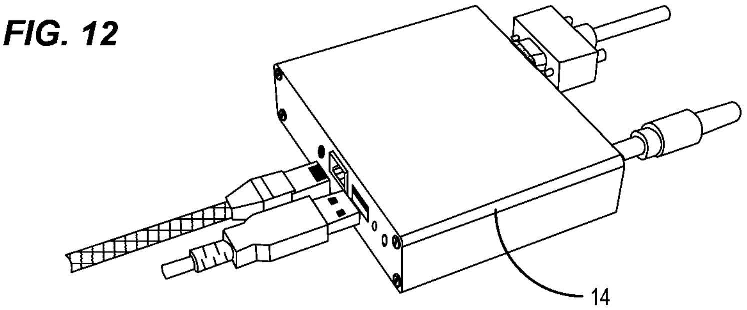

DIGITAL SIGNAGE RETROFIT FOR VENDING MACHINE

CROSS REFERENCE TO RELATED DOCUMENTS

This application is related to and claims priority benefit of U.S. Provisional Patent Application No. 61/496,267 filed Jun. 13, 2011 and U.S. Provisional Patent Application No. 61/590,931 filed Jan. 26, 2012 both of which are hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

At this writing, there exists a large installed base of vending machines of various types that have no facilities for digital signage. As a result, the continued deployment of these machines prevents use of digital signage to increase sales and provide enhanced functionality for the user. However, since such machines generally have a long life in the field, it is not always economical—even in the face of the possibility of increased sales and other benefits—to replace an installed vending machine.

SUMMARY OF THE DISCLOSURE

Some or all of the above needs can be addressed by various embodiments described herein. Certain embodiments of the disclosure can provide a vending machine with digital signage.

In one embodiment, a digital signage vending machine retrofit kit can be implemented. The digital signage vending machine retrofit kit can include a touchscreen display panel and AC power cable; a media player and power supply; a cellular wide area network (WAN) radio and power supply; a cellular antenna; an antenna cable; one or more strips of double sick foam tam an installation kit with adhesive primer, a cleaning cloth, alcohol cleaning wipe, assorted adhesive tie-wrap blocks, assorted tie wraps, and hook and loop fastener strips; and printed installation instructions. In addition, the digital signage vending machine retrofit kit can include T-Taps and AC power cord for tapping into existing AC power. Furthermore, the digital signage vending machine retrofit kit can include a video cable, an Ethernet cable, and a universal serial bus (USB) cable. Moreover, the digital signage vending machine retrofit kit can include touchscreen LCD display that could use projected capacitive touch sensing.

In another embodiment, digital signage vending machine retrofit kit can be implemented. The digital signage vending machine retrofit kit can include a touchscreen display panel and AC power cable; a media player and power supply; a cellular wide area network (WAN) radio and power supply; a cellular antenna; an antenna cable; a video cable; a universal serial bus (USB) cable; an Ethernet cable; T-Taps and AC power cord for tapping into existing AC power; one or more strips of double sick foam tape; an installation kit with adhesive primer, a cleaning cloth, alcohol cleaning wipe, assorted adhesive tie-wrap blocks, assorted tie wraps, and hook and loop fastener strips; and printed installation instructions.

In an additional embodiment, vending machine with digital signage can be implemented. The vending machine with digital signage can include a door with a window in the door, where the door closes to form an interior compartment and where the vending machine has a top surface; a display panel affixed to the window from the interior compartment so that images displayed on the display panel are visible through the window; a media player coupled to the display panel to play video content on the display panel; a cellular wide area network (WAN) radio coupled to the media player to receive video content via the cellular WAN; and a cellular antenna coupled to the cellular WAN radio and affixed to the top surface of the vending machine. Additionally, the vending machine can include touchscreen LCD display that could use projected capacitive touch sensing, where the display panel is affixed to the window using double-stick foam tape.

In yet another embodiment, vending machine with digital signage can be implemented. The vending machine with digital signage can include a door with a window in the door, where the door closes to form an interior compartment; a touchscreen display panel affixed to the window by double stick foam tape; the touchscreen display panel comprises a touchscreen LCD display using projected capacitive touch sensing; a media player coupled to the display panel to play video content on the display panel; a cellular wide area network (WAN) radio coupled to the media player to receive video content via the cellular WAN; and a cellular antenna coupled to the cellular WAN radio.

Other embodiments, features, and aspects of the disclosure are described in detail herein and are considered a part of the claimed disclosure. For a better understanding of embodiments of the disclosure with features and aspects, refer to the description and to the drawings.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 4 is an example of a vending machine display depicting preferred placement of double-stick tape for mounting in a manner consistent with certain embodiments of the present invention.

FIG. 5 is an example of a cross-section of a touch-panel display mounted to the inner surface of a glass window in a vending machine door in a manner consistent with certain embodiments of the present invention.

FIG. 10 is an example of a power supply (AC to DC converter) consistent with certain embodiments of the present invention.

FIG. 11 is an example illustration depicting cable connection to the media player in a manner consistent with certain embodiments of the present invention.

FIG. 12 is an example illustration depicting addition cable connections to the media player in a manner consistent with certain embodiments of the present invention.

DETAILED DESCRIPTION

Figure 1:
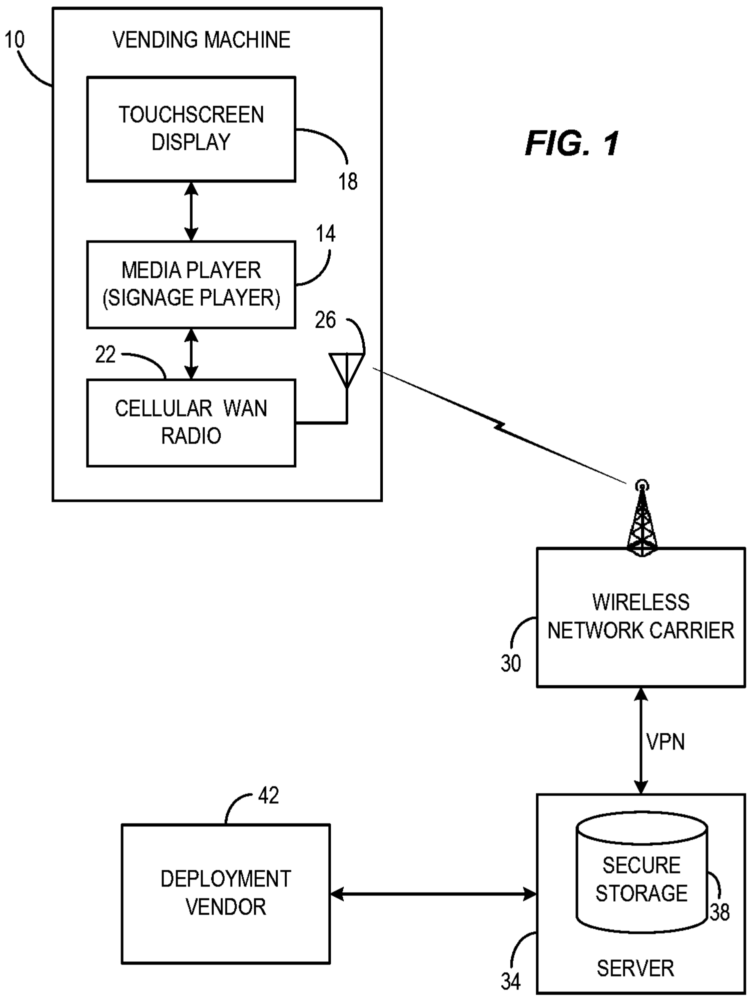
FIG. 1 is an example of a block diagram of a vending machine signage system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As previously noted, there exists a large installed base of vending machines of various types that have no facilities for digital signage. As a result, the continued deployment of these machines prevents use of digital signage to increase sales and provide enhanced functionality for the user. However, since such machines generally have a long life in the field, it is not always economical—even in the face of the possibility of increased sales and other benefits—to replace an installed vending machine. However, it would often be an attractive alternative to upgrade such "legacy" vending machines with digital signage and advanced features provided by user interaction with the signage.

Unfortunately, vending machines are often located in places susceptible to damage by vandalism or break-in. So, any retrofit to provide digital signage and the like should be done in a manner that protects the added components from the elements and from damage by vandals and the like.

The inventor has devised a system referred to as the Vend and Touch System to address some of these issues while providing a networked vending machine design that is readily retrofit to legacy vending machines.

Before addressing the details of the retrofit kit, an overview of the system may be useful.

Referring now to FIG. 1, the Vend and Touch system is an interactive digital signage system for a network of vending machines such as 10. The system has a media player 14 connected to an LCD touchscreen display 18, mounted behind the glass of the vending machine 10. The system can be programmed to play a rotating loop of ads consisting of graphics and video if desired. Users can use the touch screen to see related ads, special offers, etc. and to interact with the retrofitted machine. By installation of the LCD touchscreen behind the front glass panel of the vending machine, it is protected from the elements and from easy removal by the same locks that protect product and money. The system communicates via a cellular WAN radio 22 using a cellular data network via an antenna 26 to the wireless network carrier 30. This wireless network carrier 30 provides a communication link between the vending machine 10 and a server 34 with a secure database or storage 38. In the model illustrated, a separate Deployment Vendor 42 is charged with deployment of the retrofit kits in the field and informing the server operator of data relating to the deployments such as location. The Deployment Vendor 42 is also charged with interfacing with advertisers and acquiring video assets, playlists, etc. therefrom and providing such information to the server operator. The Deployment Vendor 42 is further charged with retrieving logged data from the server 34 for use in coordination of advertisements and the like.

Each device can display ads targeted to the demographics of its location, and can track impressions and user interactions, and upload logs back to a central server at regular intervals. The software architecture for this system includes a server-based system for distributing ad media and control logic to the individual vending machine systems, the code that will run on the media players to deliver the media, and a system for collecting impression and interaction data back from those systems and aggregating it into useful reports.

The vending machine system of the current implementation has a 600×800 pixel (portrait-aspect) 12 inch diagonal touchscreen display 18, attached to a VGA port of a Spinetics HMP100™ media player 14 for video to the touchscreen and its USB port for touchscreen input. Each device is installed in a snack vending machine 10, and is networked via cellular WAN radio 22, such as for example, using AT&T's 3G wireless data network. The touchscreen display 18 is preferably a Zytronic brand custom designed touchscreen LCD display using projected capacitive touch sensing.

The system can display a rotating loop of ads (either graphics or video), with an occasional graphical invitation on the screen to touch the screen for more info or special offers. Some interactive ads can have several screens, and users will be able to branch through them via touch input. After a set period, the system will time out back to its ad loop. Creative teams can assemble individual ad units into campaigns for trafficking out to the devices.

Deployed "Machines" (vending machines) can receive content and instructions from a server, using a media player operating in a "Pull" mode, i.e. the media player will contact the server at regular intervals to see if the programming for their ad content (which can be managed individually for each system or as a group) has changed. If it has, the media player downloads any new content and instructions that are needed to use the new content.

The Server 34 can be a Linux-based machine used for managing all the elements of the larger system. This will primarily include a database that contains:

- A list of all the deployed machines, including their network address, their physical address/location, their currently programmed ad campaign, their date/time of last update, etc.
- A list of all the individual ad media, including the filenames of the graphics or videos that comprise them, as well as the branching logic for interactive ads, any special offers associated with them, etc.
- A list of all of the ad campaigns, including the individual ads Each retrofitted vending machine 10 operates as a client in a client-server model with the server being server 34. The basic control language for the Media Player 14 is preferably Scalable Vector Graphics (SVG), a form of extensible markup language (XML) specialized for visual display. As with the creation of hypertext markup language (HTML) for a website, the code can be hand-written for each component of each ad, or generated programmatically by server-based software on-the-fly when requested. The same is true of the SVG code that drives the Media Player 14. Hand-coding is fast and simple, whereas server-generated code is more flexible and scales easily to much larger projects. The design can also use a hybrid approach that uses server software to generate the overall instructions for each individual vending machine system, but to hand-code the SVG for the certain ads and ad campaigns.

The server software design can be done using a hypertext transfer protocol (HTTP) based setup, hosted on a Linux system, and built upon the CakePHP rapid-development framework. Media Serving can be carried out using the following attributes:

- Protocol for file transfer: Web-based Distributed Authoring and Versioning (WebDAV) over HTTP.
- Content: PNG format image files, MP4 video files, etc.
- Manifests: XML with file modification dates (ensures only new or modified files get served, optimizing 3G network efficiency)
- Ads are organized as complete project directories, with all required media files and SVG control logic for interaction stored and trafficked together.

Ad Campaigns can be created as SVG files that reference individual ad folders in playlist-style. Some can be server-generated on the fly, and others can be built by hand. Logic for mapping campaigns to individual machines may be manual or automated. But logic is in place for complex mapping based on programmatic analysis of numerous demographic parameters.

Schedule Serving is carried out by the Media Player checking an iCal format calendar file on the server. A PULL event will initiate file update/download process and a LOG SEND event will initiate a logs upload process.

Machine Remote Health Monitoring can be provided as follows:

1. Devices contact server for update instructions (iCal directed).
   - Frequency to be determined, pending experience with 3G realities, but probably closer to every few minutes than every few days;
   - If contact rate falls below acceptable level, raise an alert via email or SMS;
   - Every device request includes its serial #, which is recorded in a server access log.
2. Devices upload logs periodically (Apple Computer's iCal™ personal calendar directed).
   - logs are parsed for errors relating to ad delivery or user interaction and any appropriate alerts are generated;
   - logs analyzed for reporting on ad impressions, interactions.

Each of entities 30, 34 and 42 are preferably assigned responsibilities as follows, but this is not to be considered limiting:

Deployment Vendor Responsibilities:

- Acquire graphic and video assets from advertisers;
- Submit assets to server operator;
- Provide server operator with playlists (includes references to assets and their order if any);
- Provide server operator with location information (with updates);
- Provide server operator with playlist destinations; and
- Retrieve log information from server operator.

Server Operator Responsibilities

- Develop and maintain video player hardware and software;
- Connect to wireless network carrier via a virtual private network (VPN);
- Develop and maintain database of player locations and contents;
- Provision cellular equipment;
- Ship equipment of deployment address;
- Create ads;
- Create ad loop and interactivity software;
- Create playlists for video players;
- Determine address of video players;
- Monitor remote devices;
- Evaluate log information for video player problems;
- Submit log information to Deployment Vendor.

Wireless Network Carrier Responsibilities:

- Provide cellular WAN hardware;
- Maintain VPN to Server Operator;
- Provide cellular WAN provisioning web site;
- Work with Deployment Vendor to optimize cellular coverage for vending machines;
- Provide cellular communication to vending machines.

The vending machine equipment includes (supplied in kit form for retrofits):

- AC power wiring;
- Cellular WAN radio and antenna;
- Digital signage player;
- Touchscreen LCD display.

The Log information is preferably provided as follows:

Comments:

Data should be kept small;

Log file retrieval mechanisms dependent on communication reliability;

Each advertisement asset has its own counter file which gets incremented after every play-out;

Counters are cleared after log file is created.

Contents:

Header:

Current time and date;

Unit ID (if known);

Last time log file sent;

Unused file space;

Software version numbers.

Events

Errors: Missing assets, Communication Error, Disk full;

System boot;

Time and date assets received;

Time and date of remote command;

Asset and number of times shown.

Figure 2:
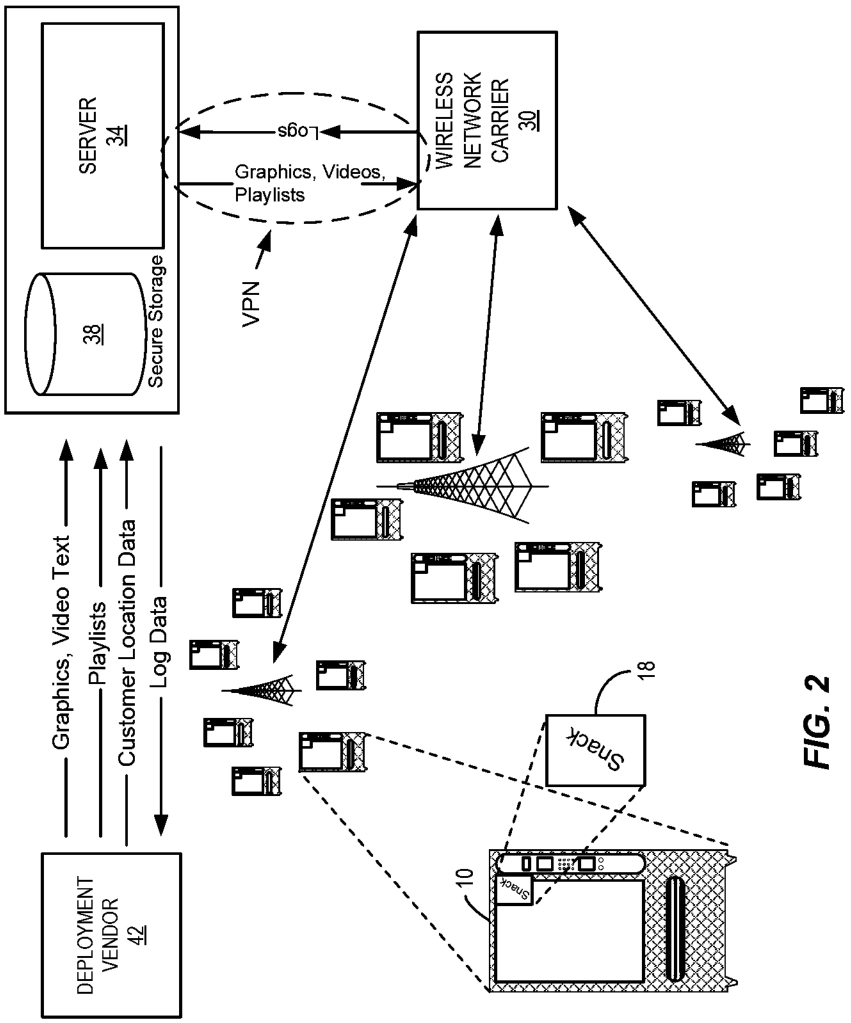
FIG. 2 is an example of a network of vending machines with signage consistent with certain embodiments of the present invention.

Turning now to FIG. 2, a broader view of a network of vending machines is depicted in which deployment 42 is shown sending graphics, video, text, play lists, and customer location data and receiving log data from the server 34 with secure database or storage 38. Server 34 downloads the graphics, playlists and videos etc. to the vending machines 10 via the wireless network carrier 30 and the VPN and receives log data back from the vending machines 10. Vending machines 10 then are able to provide advertisements, videos, etc. on touchscreen display 18.

Figure 3:
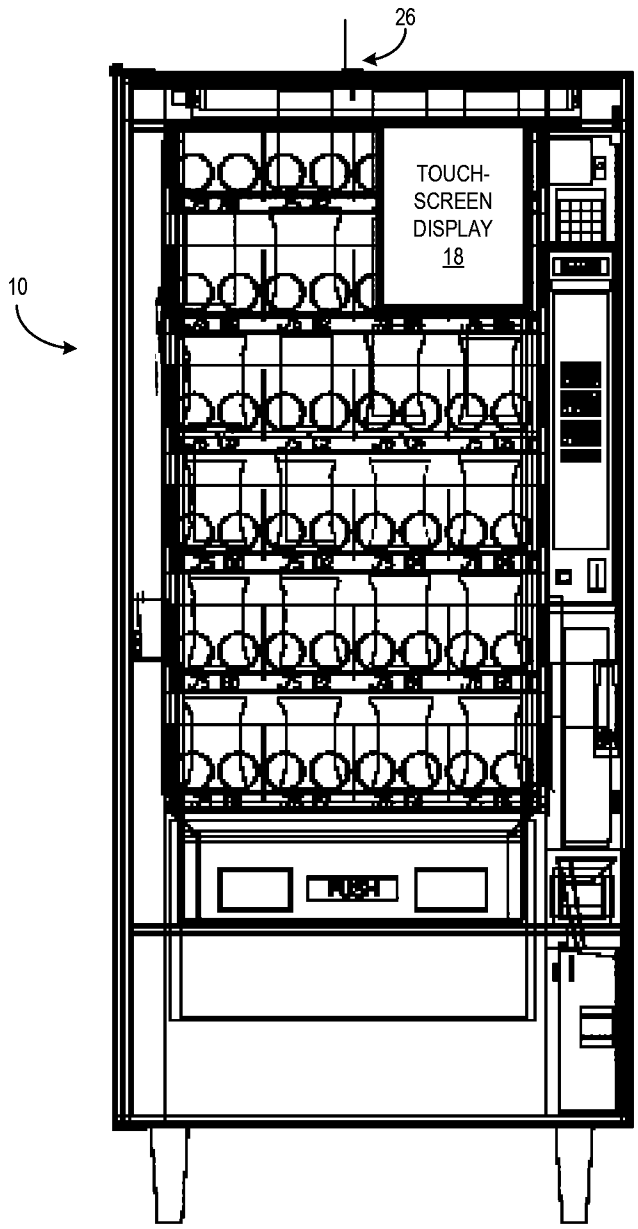
FIG. 3 is a diagram depicting an example of a vending machine having a retrofit display consistent with certain embodiments of the present invention.

FIG. 3 depicts a vending machine 10 in which a retrofit kit such as is described herein has been installed. It is observed that most vending machines in use for the past several decades have a front door including a single pane glass window (or other transparent material referred to generically as glass herein) which is generally about 4 mm thick. It has been discovered that with certain touchscreen display panels (including many of those using Zytronic's projected capacitive touch sensing) are quite sensitive and can actually be placed behind the glass window of the vending machine's door on the interior of the vending machine with the display side facing out through the window and still function well. In the example implementation, the touchscreen wires are disposed on the inside surface of the touchscreen 18.

Placing the touchscreen inside the vending machine as discussed herein provides protection of the touchscreen from the elements as well as securing the hardware from tampering or theft with the security of the locking door. There is no need to drill holes or provide mounting brackets or the like since the touchscreen display can be mounted with double sided (double-stick) tape as will be discussed. The only drilled hole that may needed is to attach antenna 26. Double-stick tape has adhesive on both major surfaces thereof.

The use of double stick foam tape for the installation provides a great deal of versatility to the retrofit, making it near universal for retrofit to a variety of vending machines and a variety of circumstances. For example, the display can be mounted either as portrait or landscape format, and can be located at any desired location of the window. It may be desirable, for example, to mount the display lower to more readily accommodate the disabled by placing the display within easy reach of a person in a wheelchair. Or, it may be desirable to place the display in a location that does not cover product.

In the preferred implementation, 3M brand VHB double stick foam tape is used, but other types of tape may also be suitable. This tape can be removed cleanly without special tools and residue can be removed with alcohol. This tape also operates well over a very wide range of temperatures and holds the display firmly in place. To provide for ease of removal, the tape can be applied along three edges of the display—top and two sides as depicted by tape strips 70, 72 and 74 of FIG. 4. The tape is applied to a frame border 78 surrounding the display panel 18 and the display panel 18 can then be affixed to the inside of the glass. This is depicted in a side cutaway view in FIG. 5. In this illustration, the display panel 18 is shown with a flange-like frame border 78 around the display. The strips of double stick foam tape 70 and 72 are shown forming a bond between the frame border 78 and the glass window 80 of the vending machine door. Once installed, a touch from a user's finger on the glass will activate the corresponding area of the touchscreen.

Figure 6:
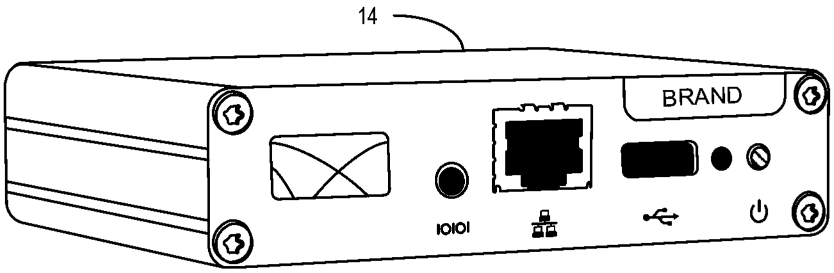
FIG. 6 is an example of a media player consistent with certain embodiments of the present invention.
Figure 7:
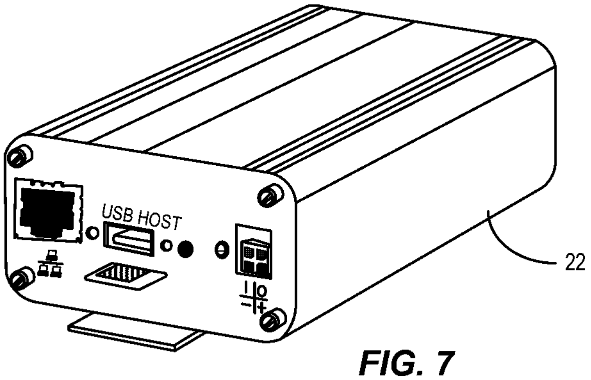
FIG. 7 is an example of a cellular network radio modem consistent with certain embodiments of the present invention.
Figure 8:
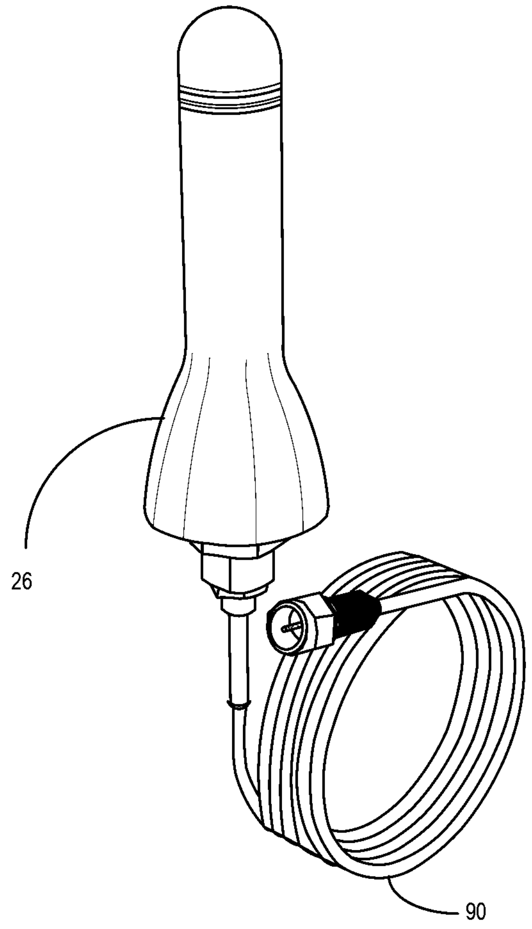
FIG. 8 is an example of a cellular antenna and connecting cable consistent with certain embodiments of the present invention.

In one implementation, a retrofit kit is provided which includes the following components:

A touchscreen display panel (18)—also referred to as the VMDS12TA interactive digital sign;

A media player (14)—also referred to as a digital signage player and shown in FIG. 6;

A cellular WAN radio (22)—also referred to as a cellular modem and shown in FIG. 7;

A cellular antenna (26) and an attached coaxial cable 90 shown in FIG. 8;

Strips of double-stick foam tape (70, 72, 74);

DC power supplies (AC/DC converters) the media player and the cellular WAN radio;

AC power cable for the touchscreen display panel;

An installation kit (100 of FIG. 9) including Adhesive primer 102, Microfiber cleaning cloth 106, Alcohol cleaning wipe 110, Assorted large and small adhesive tie-wrap blocks 114 and 118, Assorted large and small tie wraps 122 and 126, and hook and loop fastener strips 130;

VGA video cable;

Ethernet cable;

USB cable;

T-Taps and AC power cord for tapping into existing AC power; and

Installation manual.

The retrofit kit described herein (the model VMDS12TAK digital signage kit) is provided with an installation manual which can have text similar to the following with accompanying illustrations (supplemented herein by reference to illustrative figures):

Installation Manual

Snack machine owners can now add interactive digital signage to their existing inventory using the VMDS12TAK digital signage kit. At the heart of the kit is the VMDS12TA interactive digital sign which can be installed in almost any single pane, glass front snack machine. And even though the display is mounted behind glass, customers can interact with the unit like a regular touchscreen.

System Parts

Below is a detailed description of the parts included in the VMDS12TAK kit:

SpinetiX HMP100 Digital Signage Player

The SpinetiX HMP100™ (FIG. 6) is a state of the art digital signage player that provides powerful and flexible video play out while consuming only 2 watts of energy. Because it runs so cool and has no moving parts HMP100 will provide years of trouble free operation. Included with the SpinetiX HMP100 is a power supply (FIG. 10), a 1 foot Cat5e cable and hook and loop adhesive tape for mounting the HMP100 to a convenient location.

CalAmp LandCell Cellular WAN Radio

The CalAmp LandCell™ Cellular WAN (Wide Area Network) Radio connects the SpinetiX HMP100 to a central datacenter using cellular modem technology. In addition to hook and loop adhesive tape for mounting purposes, the unit also comes with a power supply (not shown) and external screw-down antenna. The SIM card required will be configured, provisioned and installed in the unit before being shipped.

Cellular WAN Antenna

A cellular antenna is included for the appropriate radio band and includes an attached 9 foot coaxial cable.

AC Power Kit

Included in the VMDS12TAK box is an AC power kit which can be used if there are no AC power sockets available inside the vending machine.

Installation Kit

Figure 9:
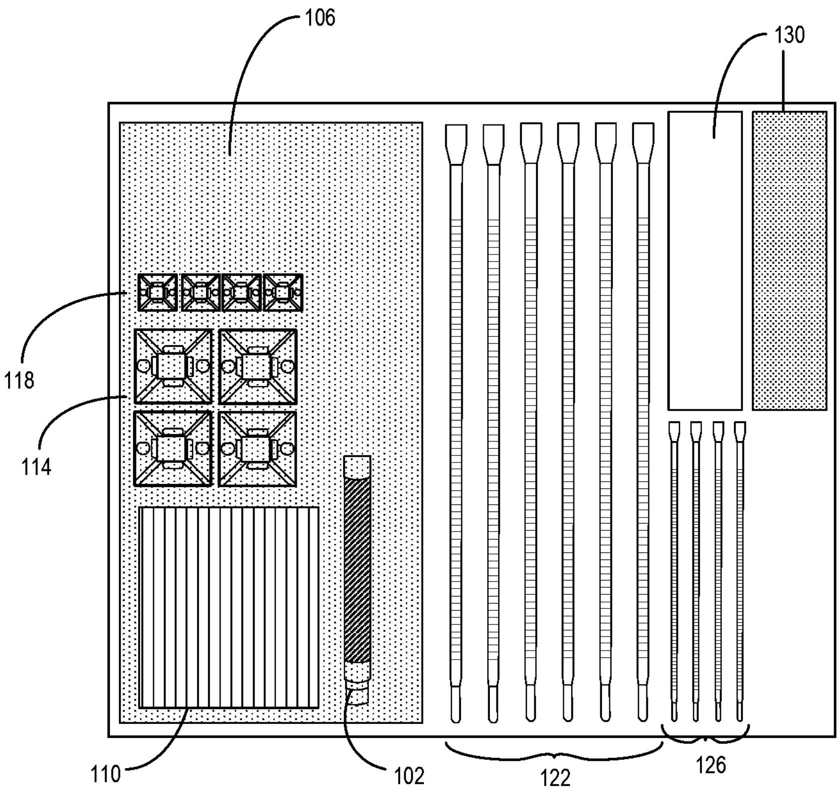
FIG. 9 is an example of an installation kit consistent with certain embodiments of the present invention.

Use the installation kit (FIG. 9 to ensure proper attachment of the various adhesives and to make installation easier and cleaner. Included in the kit are:

- A microfiber cloth and an alcohol pad for cleaning areas where adhesives will be placed;
- 3M 94™ brand primer capsule to promote adhesion of adhesives;
- Tie-wraps and tie-wrap blocks of various sizes for cable installation;
- Hook and loop tape for mounting the digital sign power supply.

VMDS12TA AC Power Cord

This power cord is used to supply AC power to the video display.

Tools:

To install the VMDS12TA digital sign the following tools may be required:

Wire Cutters

Wire cutters will be used to trim the tie-wraps.

Pliers

Pliers will be used to crimp the T-Taps for the AC power.

Drill with ½" or 12 mm Drill Bit

The drill and bit will be used to install the cellular antenna.

¾" or 19 mm Open-End or Adjustable Wrench

An open-end wrench will be used to tighten the mount nuts on the cellular antenna.

Volt Meter

A volt meter will be used to test the AC power.

Installation Procedure:

This section will provide information on how to install the VMDS12TA digital sign and associated equipment. Since there are many models of vending machines as well as many customer preferences the information provided below will be general in nature.

Safety

The equipment in the VMDS12TAK system kit requires 110VAC, 60 Hz power. If there are no power outlets inside the snack machine the AC power kit can be used to tap into AC power lines located inside the cabinet. DO NOT INSTALL THE AC POWER KIT YOURSELF IF YOU ARE UNQUALIFIED TO DO SO!

Determine how to Best Install the Parts

As you consider how to install the various parts know that:

- The USB, VGA & power cables for the VMDS12TA are 15 feet long;
- The cellular antenna cable is 9 feet long;
- The power supplies for the touchscreen display (VMDS12TA), the digital signage player, and the cellular WAN radio all come with hook & loop adhesive strips for attachment to flat, clean surfaces within the cabinet;
- Tie-wraps and tie-wrap blocks of various sizes are provided for attaching cables to the sides and roof of the cabinet;
- The digital signage player and cellular WAN radio are low power devices and can be place in tight locations without ventilation; Remember the following while installing the VMDS12TAK:
- Try to position the digital signage player and cellular WAN radio so that the indicator lights can be easily seen for diagnostic purposes;
- Place equipment and cables so that they don't interfere with or become damaged by normal operating procedures such as:
- Opening the cabinet door;
- Removing the cash box;
- Placing snacks in trays;
- Storing extra snacks underneath the trays;
- Removing the snack trays;
- Accessing the electronics panel;
- replacing/repairing parts;

Install AC Power

Three AC power receptacles are required for this installation. If a snack machine does not provide the power sockets required for this installation an AC power kit may be used instead.

The AC power kit comes with:

- An AC power cable with 3, 2-prong receptacles on one end and 2 spade lugs (or Quick Disconnects) on the other end;
- 2-16AWG T-Taps;

AC power can typically be found in vending machines near the lighting or in proximity to the control panel. Use a volt meter to check for power in the wires. When wires have been identified follow the steps shown in the figures below:

1. Turn off AC power to the snack machine.
2. Place the AC wire in the T-Tap tooth.
3. Fold the T-Tap in half and use a pair of pliers to press the halfs together.
4. Insert the spade lug into the T-Tap. Ridges on the outside of the AC cable indicate the neutral wire while the smooth AC cable is the hot wire.
5. Perform this operation on both wires.
6. Turn on power to the snack machine and use a voltmeter to verify power in the outlets.

NOTE: All the AC Powered Devices in the Kit have Unpolarized AC Plugs.

Attach VMDS12TA to Snack Machine Glass

Follow the steps below to mount the VMDS12TA in the snack machine:

1. Using the microfiber cloth and alcohol pad provided in the installation kit, thoroughly clean the area where the digital sign is to be mounted.
2. Hold the VMDS12TA in the spot where it will be mounted on the back of the snack machine glass and note where the double-stick tape on the front of the glass is located.
3. Grasp the middle of the 3M 94 primer application stick between the thumb and forefinger and crush it. Point the brush part down and wait for the liquid to reach the brush. Paint the where the double-stick tape will be placed with the primer. Use only one thin coat! Keep the application stick for later use.
4. Carefully remove the backing from the 3 strips of double-stick tape on the face of the digital sign, align the digital sign in the desired location and press it onto the glass. Hold the digital sign in place for at least 15 seconds. It is important to perform this operation correctly the first time!

5. Before removing support from the digital sign test to ensure that it is firmly attached.

Attach AC Power Cord to VMDS12TA Power Supply

Route VMDS12TA Cables

The example that follows explains how the VMDS12TA wiring could be run within a snack machine. The goal is to place all the wires and components in an out of the way location so they will not interfere with normal operation of the snack machine. The same holds true for the AC power cable as well.

TIP: You can use the microfiber cloth, alcohol pad and 3M 94 Primer to prepare the locations for the tie-wrap blocks and hook & loop tape. Cleaning and priming these areas will significantly improve the performance of the adhesives.

In this example small tie-wrap blocks were used to support the 3 cables coming out of the VMDS12TA as they run above the top of the glass window. The 3 cables are: VGA (video), USB (touch screen) & 12VDC power. If AC power is being obtained from a fluorescent light above the door, then the AC power cord provided in the kit can accompany these wires as they run down the side gutter and into the cabinet.

Remember:

Keep enough space between the cables and the fluorescent tube so that the tube can be easily replaced if need be.

The small tie-wrap blocks provided in the installation kit can support up to 13 lbs. when properly installed.

The large tie-wrap blocks can support up to 34 lbs.

Continuing from the top of the door the cable goes into a gutter on the hinge side of the door. There is room inside the gutter for the 12VDC power supply block. The cables then exit at the bottom of the door as shown in the figure above. From there the cable passes through existing wire clips and tie-wrap blocks provided in the installation kit down the left side of the cabinet and across the back on its way to the digital signage player that has been placed, along with the cellular WAN radio, behind the coin box.

Install Cellular Antenna

The cellular WAN antenna should be mounted on top of the snack machine in a vertical orientation. It is best to position the antenna in the middle of the top. This will provide the best antenna performance. However, the mount and coax cable underneath the antenna requires about 1.5 inches of space so depending on the vending machine there may not be enough room to place the antenna above the snack trays. If this is the case, you can position the antenna off to the side.

To install the cellular antenna:

1. Drill a ½" or 12 mm hole in the top of the vending machine at the desired position.

2. Remove the nuts and lock washer from the antenna mount and slide them off of the coax.

3. Insert the coax connector and approximately 12 inches of the antenna's coax into the hole that was drilled into the top of the snack machine.

4. Thread the coax all the way through the lock washer and nuts (in that order) and seat the antenna mount into the hole.

5. Place the lock washer and 1 nut onto the Antenna mount and while holding the base of the antenna to prevent it from rotating, use your fingers to tighten the nut onto the base of the antenna. Use the ¾" or 19 mm wrench to further tighten the nut. Screw on the remaining nut and tighten with a wrench to lock the screws in place.

6. Run the coax to the cellular WAN radio. If needed, use the tie-wraps and tie-wrap blocks to support the antenna coax along the roof and sides of the cabinet. Maintain a 0.59" (15 mm) worse case bend radius when routing the coax.

Connect Cables to Digital Signage Player

Now that all the cables have been routed to the digital signage player the cables need to be connected . . . .

VGA and 5 VDC Power Cables

Connect the VGA and power cables (FIG. 10) to the digital signage player (FIG. 11). When AC power is connected you should see the LEDs turn on.

Connect the USB and Ethernet cables to the other side of the digital signage player (FIG. 12).

Figure 13:
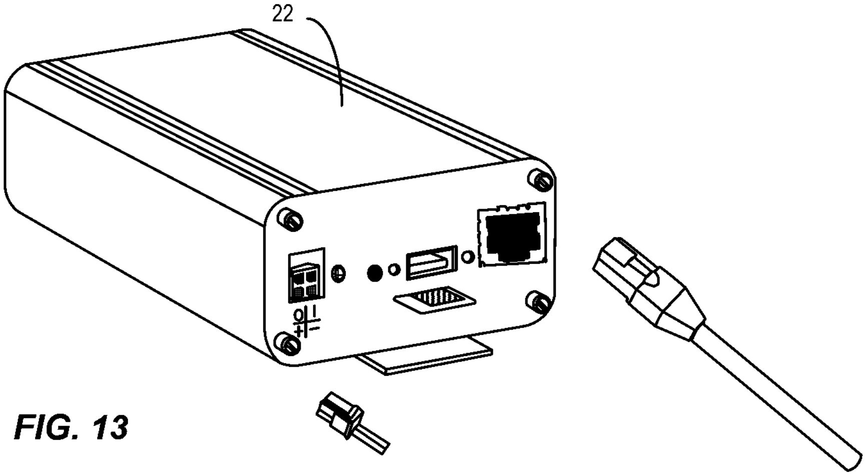
FIG. 13 is an example illustration depicting cable connection to the cellular modem in a manner consistent with certain embodiments of the present invention.

Connect Cables to the Cellular WAN Radio (FIG. 13)

Take the Ethernet cable that's connected to the digital signage player and connect the other end to the cellular WAN radio. Then connect the 12VDC power connector.

Figure 14:
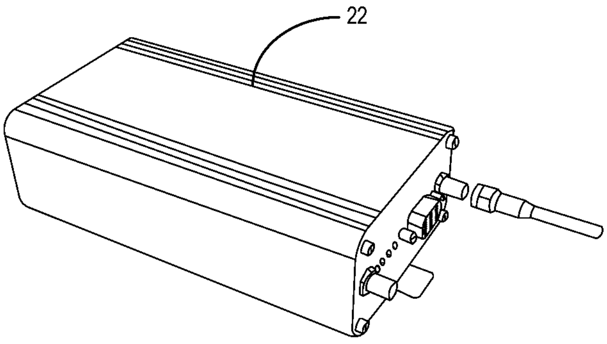
FIG. 14 is an example illustration depicting additional cable connections to the cellular modem in a manner consistent with certain embodiments of the present invention.

Attach the cellular antenna to the cellular WAN radio (FIG. 14)

Mount the Digital Signage Player and Cellular WAN Radio

Now that all the cables are connected to the digital signage player and cellular WAN radio you can use the provided hook and loop adhesive strips to attach them to the side of the cabinet.

Connect Power Supplies to Mains Power

Connect the power supply for the VMDS12TA, the digital signage player and the cellular WAN radio to mains power. If you are using the supplied AC power cord, connect to the 3 outlets on the AC power cord as shown above. Both the digital signage player and cellular WAN radio will have LEDs that turn on when power is applied.

Check System Operation

Figure 15:
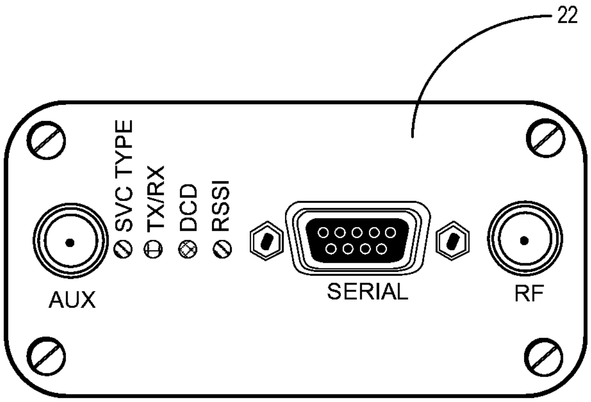
FIG. 15 is an example illustration depicting the status indicators of the cellular modem in an example installation consistent with certain embodiments of the present invention.

Once all the equipment (digital media player, cellular WAN Radio, antenna, etc.) is installed, verify connectivity to the cellular network by checking the LEDs on the front panel of the cellular WAN radio (FIG. 15) as described in TABLE 1 below:

TABLE 1

| Panel Indicator | Connection | Description |
|---|---|---|
| SVC Type Service Type | Solid = Higher Speed Service | Blinking = Lower Speed Service |
| TX/RX Transmit/Receive | Indication of data transmission | or reception activity |
| DCD | Data Carrier | Detect |
| Indicates modems connection on | the Cellular network | RSSI |
| | Indicator | Off = poor or none |

Ideally the LED for "SVC Type" and "RSSI" should be solid but it will work if they are blinking.

The LED for "TX/RX" will blink only when data is being transmitted. Otherwise it will be off.

The LED for "DCD" MUST BE ON!

If the LEDs show that there is a poor connection, make sure that the connector is on tightly and that there are no tight kinks in the antenna cable.

Verify connectivity to the cellular network.

Maintenance

The VMDS12TA should not require any regular maintenance.

Detaching the VMDS12TA from the Snack Machine

To remove the VMDS12TA from the snack machine glass use a thin sheet of metal that is at least as wide as the touch screen and carefully insert it under the touch screen glass at the bottom. Slowly push the metal sheet up until the touch screen is detached from the glass. The display unit cannot be reinstalled without first removing the old double-stick tape and replacing it with new double-stick tape. Old tape can be removed with 50 to 90% alcohol and a razor blade scraper. End Thus, in accord with certain implementations, a digital signage vending machine retrofit kit has a touchscreen display panel and an AC power cable; a media player and power supply therefor; a cellular wide area network (WAN) radio and power supply therefor; a cellular antenna; an antenna cable; one or more strips of double-stick foam tape; an installation kit with an adhesive primer, a cleaning cloth, an alcohol cleaning wipe, assorted adhesive tie-wrap blocks, assorted tie wraps, and hook and loop fastener strips; and printed installation instructions.

The kit can further include any or all of T-Taps and AC power cord for tapping into existing AC power, a video cable, an Ethernet cable, a universal serial bus (USB) cable. The display panel can be a touchscreen display panel such as a touchscreen LCD display panel using projected capacitive touch sensing or other touchscreen LCD display.

Another example digital signage vending machine retrofit kit has a touchscreen display panel and an AC power cable; a media player and power supply therefor; a cellular wide area network (WAN) radio and power supply therefor; a cellular antenna; an antenna cable; a video cable; a universal serial bus (USB) cable; an Ethernet cable; T-Taps and an AC power cord for tapping into existing AC power; one or more strips of double-stick foam tape; an installation kit with an adhesive primer, a cleaning cloth, an alcohol cleaning wipe, assorted adhesive tie-wrap blocks, assorted tie wraps, and hook and loop fastener strips; and printed installation instructions.

An example vending machine with digital signage consistent with certain implementations has a vending machine having a door with a window in the door, where the door closes to form an interior compartment and where the vending machine has a top surface. A display panel is affixed to the window from the interior compartment so that images displayed on the display panel are visible through the window. A media player is coupled to the display panel to play video content on the display panel. A cellular wide area network (WAN) radio is coupled to the media player to receive video content via the cellular WAN. A cellular antenna is coupled to the cellular WAN radio and affixed to the top surface of the vending machine.

In certain implementations, the display panel detects touches through the window. In certain implementations, the touchscreen display panel comprises a touchscreen LCD display panel using projected capacitive touch sensing. In certain implementations, the touchscreen display panel comprises a touchscreen LCD display. In certain implementations, the display panel is affixed to the window using double-stick tape. In certain implementations, the display panel is affixed to the window using three strips of double-stick tape, one adjacent a top edge, and two adjacent left and right sides of the display panel respectively. In certain implementations, the double-stick tape comprises double stick foam tape.

Another example vending machine with digital signage has a vending machine having a door with a window in the door, where the door closes to form an interior compartment and where the vending machine has a top surface. A touchscreen display panel is affixed to the window by double stick foam tape from the interior compartment so that images displayed on the display panel are visible through the window and where the display panel detects touches through the window. The touchscreen display panel has a touchscreen LCD display using projected capacitive touch sensing. A media player is coupled to the display panel to play video content on the display panel. A cellular wide area network (WAN) radio is coupled to the media player to receive video content via the cellular WAN. A cellular antenna is coupled to the cellular WAN radio and affixed to the top surface of the vending machine. In certain implementations, the display panel is affixed to the window using three strips of double-stick tape, one adjacent a top edge, and two adjacent left and right sides of the display panel respectively.

Those skilled in the art will recognize, upon consideration of the above teachings, that certain of the above exemplary embodiments are based upon use of one or more programmed processors programmed with a suitable computer program. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A digital signage vending machine retrofit kit, comprising:
- a touchscreen display panel and an AC power cable;
- a media player and power supply therefor;
- a cellular wide area network (WAN) radio and power supply therefor;
- a cellular antenna;
- an antenna cable;
- one or more strips of double-stick foam tape;
- an installation kit with an adhesive primer, a cleaning cloth, an alcohol cleaning wipe, assorted adhesive tie-wrap blocks, assorted tie wraps, and hook and loop fastener strips; and
- printed installation instructions.

2. The digital signage vending machine retrofit kit according to claim 1, further comprising T-Taps and AC power cord for tapping into existing AC power.

3. The digital signage vending machine retrofit kit according to claim 1, further comprising a video cable.

4. The digital signage vending machine retrofit kit according to claim 1, further comprising an Ethernet cable.

5. The digital signage vending machine retrofit kit according to claim 1, further comprising a universal serial bus (USB) cable.

6. The digital signage vending machine retrofit kit according to claim 1, where the display panel comprises a touchscreen display panel.

7. The digital signage vending machine retrofit kit according to claim 6, where the touchscreen display panel comprises a touchscreen LCD display using projected capacitive touch sensing.

8. The digital signage vending machine retrofit kit according to claim 6, where the touchscreen display panel comprises a touchscreen LCD display.

9. A digital signage vending machine retrofit kit, comprising:

a touchscreen display panel and an AC power cable;

a media player and power supply therefor;

a cellular wide area network (WAN) radio and power supply therefor;

a cellular antenna;

an antenna cable;

a video cable;

a universal serial bus (USB) cable;

an Ethernet cable;

T-Taps and an AC power cord for tapping into existing AC power;

one or more strips of double-stick foam tape;

an installation kit with an adhesive primer, a cleaning cloth, an alcohol cleaning wipe, assorted adhesive tie-wrap blocks, assorted tie wraps, and hook and loop fastener strips; and printed installation instructions.

10. A vending machine with digital signage, comprising:

a vending machine having a door with a window in the door, where the door closes to form an interior compartment and where the vending machine has a top surface;

a display panel affixed to the window from the interior compartment so that images displayed on the display panel are visible through the window;

a media player coupled to the display panel to play video content on the display panel;

a cellular wide area network (WAN) radio coupled to the media player to receive video content via the cellular WAN; and a cellular antenna coupled to the cellular WAN radio and affixed to the top surface of the vending machine.

11. The vending machine according to claim 10, where the display panel comprises a touchscreen display panel and where the display panel detects touches through the window.

12. The vending machine according to claim 11, where the touchscreen display panel comprises a touchscreen LCD display panel using projected capacitive touch sensing.

13. The vending machine according to claim 11, where the touchscreen display panel comprises a touchscreen LCD display.

14. The vending machine according to claim 10, where the display panel is affixed to the window using double-stick tape.

15. The vending machine according to claim 14, where the display panel is affixed to the window using three strips of double-stick tape, one adjacent to a top edge, and two adjacent to the left and right sides of the display panel respectively.

16. The vending machine according to claim 14, where the double-stick tape comprises double stick foam tape.

17. A vending machine with digital signage, comprising:

a vending machine having a door with a window in the door, where the door closes to form an interior compartment and where the vending machine has a top surface;

a touchscreen display panel affixed to the window by double-stick foam tape from the interior compartment so that images displayed on the display panel are visible through the window and where the display panel detects touches through the window; and where the touchscreen display panel comprises a touchscreen LCD display using projected capacitive touch sensing;

a media player coupled to the display panel to play video content on the display panel;

a cellular wide area network (WAN) radio coupled to the media player to receive video content via the cellular WAN; and a cellular antenna coupled to the cellular WAN radio and affixed to the top surface of the vending machine.

18. The vending machine according to claim 17, where the display panel is affixed to the window using three strips of double-stick tape, one adjacent to a top edge, and two adjacent to the left and right sides of the display panel respectively.

* * * * *